United States Patent [19]

O'Leary

[11] Patent Number: 5,049,060
[45] Date of Patent: Sep. 17, 1991

[54] SEAL FLARING AND SHIPPING MANDREL ASSEMBLY

[75] Inventor: Thomas D. O'Leary, Painted Post, N.Y.

[73] Assignee: Dresser-Rand Company, Corning, N.Y.

[21] Appl. No.: 591,574

[22] Filed: Sep. 21, 1990

[51] Int. Cl.⁵ .................. B29C 43/04; B29C 43/44; B29C 55/22; B29C 57/04
[52] U.S. Cl. .................................. 425/393; 72/115; 264/320; 264/DIG. 66
[58] Field of Search ....... 264/320, 322, 296, DIG. 66; 425/383, 384, 392, 393, 394, 398, 403; 72/115

[56] References Cited

U.S. PATENT DOCUMENTS

| | | | |
|---|---|---|---|
| 2,699,575 | 1/1955 | Haury | 425/392 |
| 3,494,643 | 2/1970 | Longshaw et al. | 264/320 |
| 4,383,966 | 5/1983 | Svetlik | 425/393 |
| 4,551,292 | 11/1985 | Fletcher et al. | 425/393 |

FOREIGN PATENT DOCUMENTS 197712  12/1977  U.S.S.R. .................. 425/393

Primary Examiner—Willard E. Hoag
Attorney, Agent, or Firm—R. J. Falkowski; B. J. Murphy

[57] ABSTRACT

The Assembly has a circular platform, which is threaded about its periphery, and has an upstanding stub about which to set a sleeve-type or cylindrical seal, as well as an arcuately cross-sectioned groove in circumscription of the base of the stub. A cup-shaped closure, having a circular wall, and threaded on the inner wall surface, threadedly engages the threaded periphery of the platform. Upon the platform and closure being threadedly engaged, the closure forces the seal along the stub until an inner end of the seal enters the groove and takes on a proper flare. The closure protects the seal from shipping damage.

13 Claims, 2 Drawing Sheets

SEAL FLARING AND SHIPPING MANDREL ASSEMBLY

This invention pertains to sleeve-type or cylindrical seals for use in non-lubricated high pressure, gas compressors, and in particular to means for flaring and shipping such seals toward minimizing problems attending the installation of such seals in the compressors.

Seals of the type to which the invention pertains are those such as disclosed in U.S. Pat. No. 4,890,542, issued Jan. 2nd, 1990, to Bernard F. Miller, John A. Sawyer, and Wayne F. Wehber, for a Seal for a High-Pressure, Fluid Machine. When properly installed, such seals have an end flare which reciprocably engages, and seals along, the wall of a cylinder. The flaring is done to insure that only the end of the seal bears the frictional, reciprocable engagement, and the remaining portion of the seal can maintain a spaced-apart disposition relative to the wall of the cylinder.

Maintenance and servicing personnel, however, have some difficulty in properly flaring the end of these seals to insure that the cylinder wall engagement thereof is effective.

What has been needed is some means for shipping such seals to stock (a) protected from shipping damage, and (b) properly flared for immediate installation in such compressors as are in need of servicing and maintenance.

It is an object of this invention to provide such a needed means, by setting forth a novel seal flaring and shipping mandrel assembly.

Particularly, it is an object of this invention to set forth just such a seal flaring and shipping mandrel assembly comprising platform means for receiving a cylindrical seal thereupon; and closure means for enclosing said platform therewithin; wherein one of said means has a stub about which to set such seal; one of said means has an arcuately cross-sectioned groove formed therein in which to receive and flare an end of such seal; and said closure means and said platform means have mutually engaging means for forcing an end of such seal into said groove for the flaring thereof.

Further objects of this invention, as well as the novel features thereof, will become more apparent by reference to the following description taken in conjunction with the accompanying figures, in which:

BRIEF DESCRIPTION OF THE DRAWINGS

As shown in FIGS. 1 through 3, the novel assembly, according to an embodiment 10 thereof, comprises a circular platform 12 which has threads 14 formed in the periphery thereof, and a circular stub 16 which rises, perpendicularly, from the center of an inner surface 18 thereof. In addition, the platform 12 has a groove 20, circumscribing the stub 16, which is arcuately formed. An underlying rib 22, which extends from an outer surface 24 of the platform 12. The rib 22 is provided for digital or tool engagement for threadedly turning the platform 12, and its closure 26 into engagement.

Figure 1:
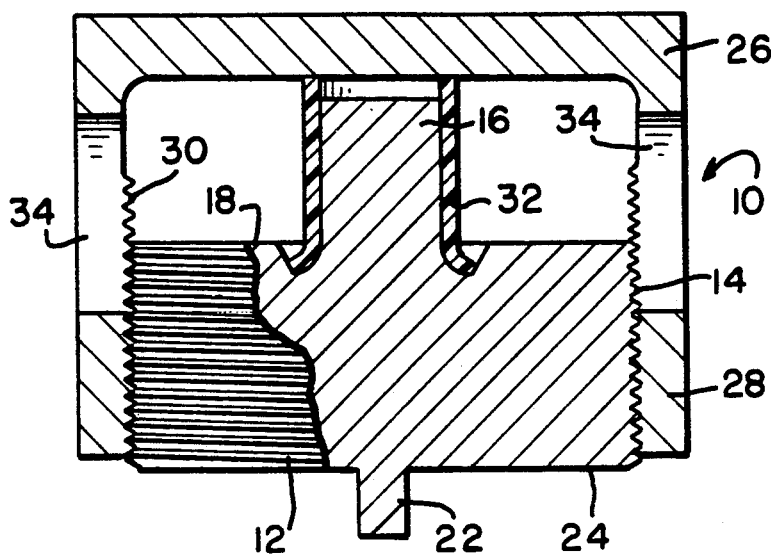
FIG. 1 is a vertical, cross-sectional view of an embodiment of the novel assembly.
Figure 5:
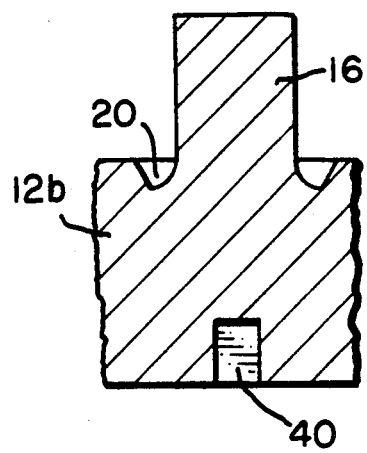
FIG. 5 is a fragmentary, vertical cross-sectional view of an alternative embodiment of the platform.
Figure 3:
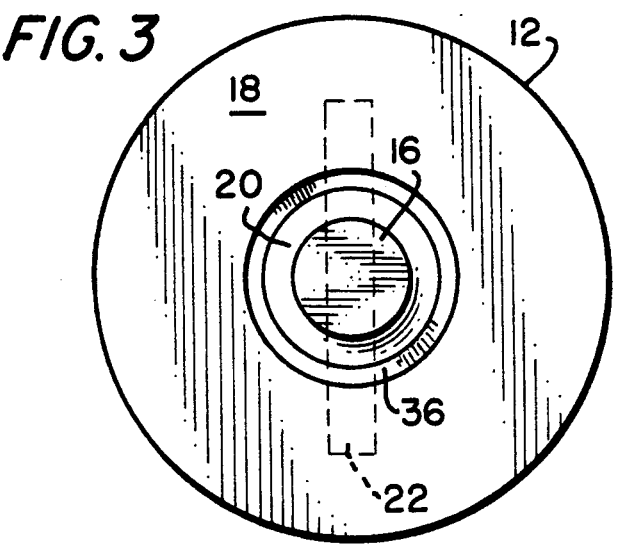
FIG. 3 is a bottom view of the platform of FIGS. 1 and 2.
Figure 6:
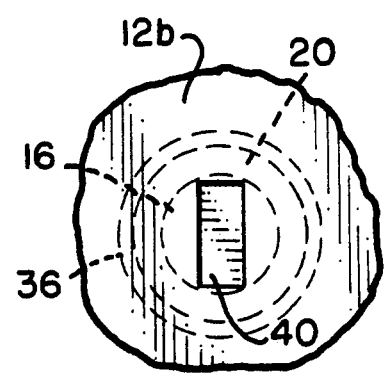
FIG. 6 is a bottom view, again fragmentary, of the platform of FIG. 5
Figure 2:
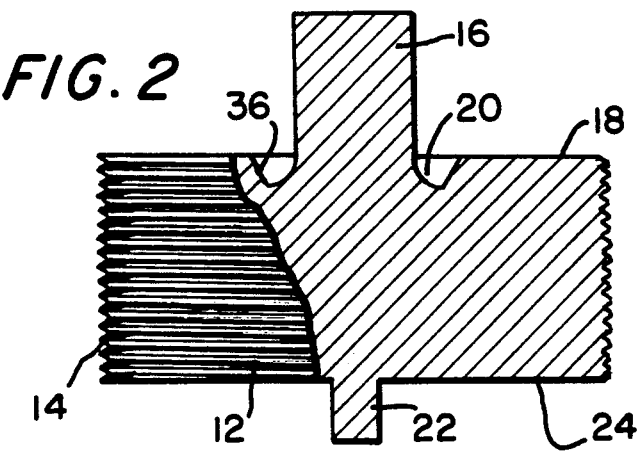
FIG. 2 is a view, like that of FIG. 1, of the platform alone.

The closure 26 is cup-shaped, and of circular configuration, having a circular wall 28. The inner surface of the wall 28 has threads 30 for matingly engaging the threads 14 of the platform 12.

The stub 16 is provided to receive a seal 32, of sleeve-type or cylindrical conformation, thereabout. Upon the seal being emplaced about the stub 16, the closure 26 is threadedly engaged with the platform 12, and the closure 26 is threadedly turned onto the platform 12, by means of the rib 22. As a consequence thereof, the innermost end of the seal 32 is forced to enter the groove 20 and flares.

The closure 26 has viewing apertures 34 formed in the wall 28 thereof, through which the entry of the seal 32, into the groove 20, can be observed. The groove 20 has a sloped wall or ramp 36 which defines a stop for the seal end; that is, when the seal end engages the ramp 36, the flaring is diametrically correct.

Same or similar index numbers shown in FIGS. 4 through 7 denote same or similar components as those in FIG. 1.

Figure 4:
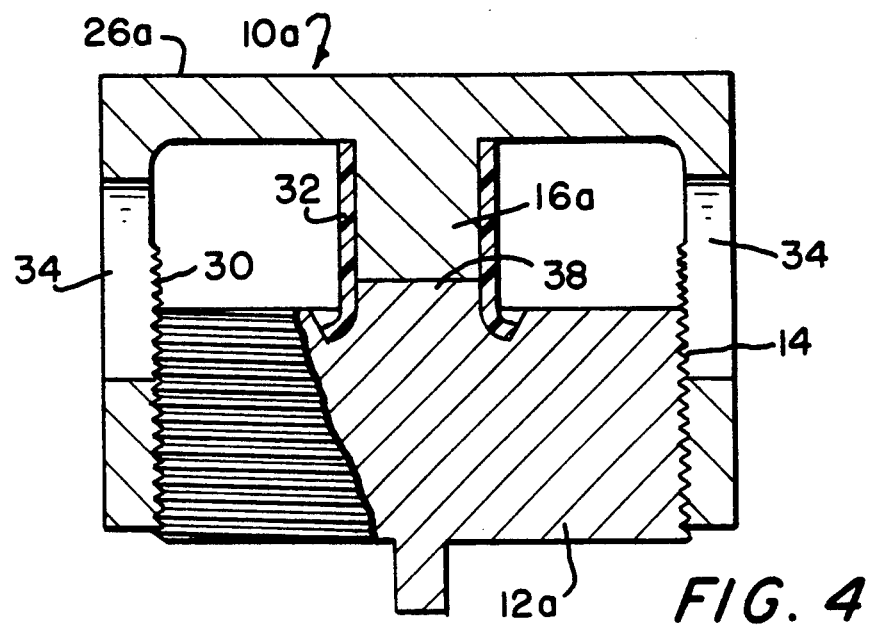
FIG. 4 is a view, like that of FIG. 1, of an alternative embodiment of the invention.

An alternative embodiment 10a of the invention is shown in FIG. 4 where the stub 16a is integral with the closure 26a. Additionally, the stub 16a meets a boss 38 formed in the center of the platform 12a, and abuts thereagainst, when the seal 32 has engaged the ramp 36 and is properly flared.

In lieu of an extending rib 22, an alternative embodiment of the platform 12b has a screw-driver-receiving slot 40 formed in the underlying or outer surface thereof for threadedly engaging the platform 12b and the closure 26 or 26a.

To revert to the aforementioned U.S. Pat. No. 4,890,542, the flared seal therein is energized by means of a compression spring. The latter is provided to keep the flared end in engagement with the cylinder wall. The alternative embodiment 10b of the invention shown in FIG. 7 provides means for including the energizing spring in the shipped package.

Figure 7:
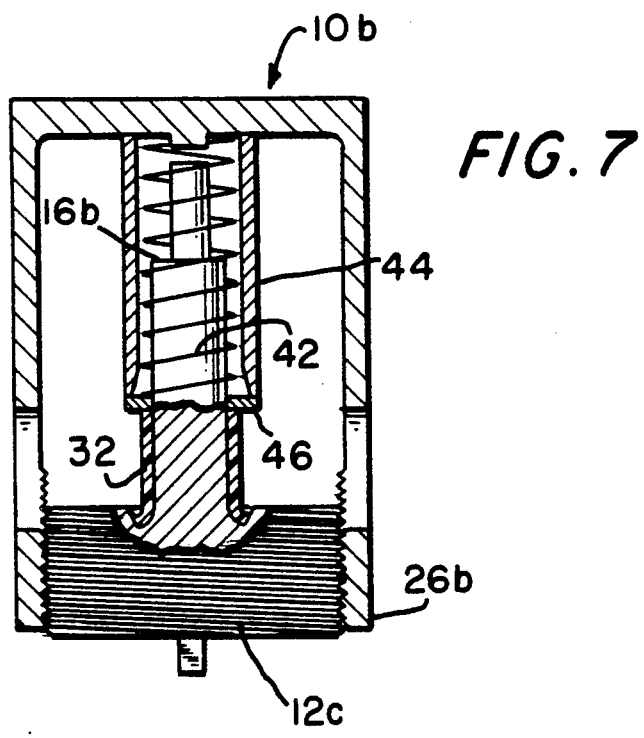
FIG. 7 is a view like that of FIG. 1 of another embodiment of the invention.

As shown in FIG. 7, the closure 26b is considerably elongated. So too is the stub 16b of greater length. This is done to accommodate the energizer spring 42 therein and about the stub 16b. Herein, now, to force the seal 32 into the groove 20, a sleeve 44 having an end which bears against a washer 46, is employed. The sleeve 44 encloses and confines the spring 42, and the washer 46 is set upon the uppermost end of the seal 32. As the platform 12c and closure 26b are threadedly engaged, the sleeve 44 forces the washer against the seal 32, and the innermost end of the latter enters the groove 20 for flaring. Then, the whole package, of FIG. 7, is shipped to stock.

While I have described my invention in connection with specific embodiments thereof, it is to be clearly understood that this is done only by way of example, and not as a limitation to the scope of the invention as set forth in the objects thereof and in the appended claims.

I claim:

1. A seal flaring and shipping mandrel assembly, comprising:

platform means for receiving a cylindrical seal thereupon; and closure means for enclosing said platform means therewithin; wherein one of said means has a stub about which to set such seal;

one of said means has an arcuately cross-sectioned groove formed therein in which to receive and flare an end of such seal;

said closure means and said platform means have mutually engaging means for forcing an end of such seal into said groove for the flaring thereof;

said closure means comprises a cup-shaped element of circular configuration, having a circular wall; and said wall has viewing apertures formed therein.

2. A seal flaring and shipping mandrel assembly, according to claim 1, wherein:

said groove is formed in said platform means.

3. A seal flaring and shipping mandrel assembly, according to claim 1, wherein:

said groove is formed in said closure means.

4. A seal flaring and shipping mandrel assembly, according to claim 1, wherein:

said groove is formed in the center of said plate.

said stub rises, plerpendicular, from the center of said plate.

5. A seal flaring and shipping mandrel assembly, according to claim 1, wherein:

said platform means comprises a circular plate; and said stub rises, perpendicularly, from the center of said plate.

6. A seal flaring and shipping mandrel assembly, according to claim 5, wherein:

said groove circumscribes said stub.

7. A seal flaring and shipping mandrel assembly, according to claim 1, wherein:

said platform means comprises a circular plate; and said mutually engaging means comprises threaded surfaces within said wall, and on the periphery of said plate.

8. A seal flaring and shipping mandrel assembly, according to claim 7, wherein:

said plate has parallel, inner and outer surfaces; and said outer surface has a rib, projecting therefrom for digital or tool engagement for threadedly turning said element and said plate into engagement for (a) enclosing said plate within said element, and (b) forcing such a seal, upon the latter being set about said stub, to enter said groove for the flaring of an end thereof.

9. A seal flaring and shipping mandrel assembly, according to claim 7, wherein:

said plate has parallel, inner and outer surfaces; and said outer surface has a slot, formed therein, for tool engagement for threadedly turning said element and said plate into engagement for (a) enclosing said plate within said element, and (b) forcing such a seal, upon the latter being set about said stub, to enter said groove for the flaring of an end thereof.

10. A seal flaring and shipping mandrel assembly, comprising:

platform means for receiving a cylindrical seal thereupon; and closure means for enclosing said platform means therewithin; wherein one of said means has a stub about which to set such seal;

one of said means has an arcuately cross-sectioned groove formed therein in which to receive and flare an end of such seal; and said closure means and said platform means have mutually engaging means for forcing an end of such seal into said groove for the flaring thereof; and further including a compression spring set about said stub.

11. A seal flaring and shipping mandrel assembly, comprising:

platform means for receiving a cylindrical seal thereupon; and closure means for enclosing said platform means therewithin; wherein one of said means has a stub about which to set such seal;

one of said means has an arcuately cross-sectioned groove formed therein in which to receive and flare an end of such seal; and said closure means and said platform means have mutually engaging means for forcing an end of such seal into said groove for the flaring thereof; and further including a compression spring set about said stub; and a sleeve set about said spring.

12. A seal flaring and shipping mandrel assembly, according to claim 11, further including:

a washer, set about said stub at one end of said sleeve.

13. A seal flaring and shipping mandrel assembly, comprising:

platform means for receiving a cylindrical seal thereupon; and closure means for enclosing said platform means therewithin; wherein one of said means has a stub about which to set such seal;

one of said means has an arcuately cross-sectioned groove formed therein in which to receive and flare and end of such seal;

said closure means and said platform means have nutually engaging means for forcing an end of such seal into said groove for the flaring thereof;

said platform means comprises a circular plate;

said stub rises, perpendicularly, from the center of said plate;

said closure means comprises a cup-shaped element of circular configuration having a circular wall for wholly confining such seal therewithin for protected shipping of such seal; and said groove has means defining a flaring-limit stop, for such seal, which comprises a sloped ramp for engagement thereof by a correctly flared end of such seal.

* * * * *